United States Patent [19]
Felice et al.

[11] 3,898,249
[45] Aug. 5, 1975

[54] PROCESS FOR MAKING PHTHALIC ANHYDRIDE

[75] Inventors: Klaus Felice, Donaustauf; Josef Sedlmeier, Munich; Otto Wiedemann, Munich-Geiselgasteig; Walter Gierer, Regensburg, all of Germany

[73] Assignee: Wacker-Chemie GmbH, Munich, Germany

[22] Filed: Aug. 1, 1973

[21] Appl. No.: 384,678

[30] Foreign Application Priority Data
Aug. 2, 1972 Germany............................ 2238067

[52] U.S. Cl. ............................................. 260/346.4
[51] Int. Cl.² .................................... C07D 307/89
[58] Field of Search ................................. 260/346.4

[56] References Cited
UNITED STATES PATENTS

| | | | |
|---|---|---|---|
| 2,142,678 | 1/1939 | Porter | 260/346.4 |
| 3,799,886 | 3/1974 | Felice et al. | 260/346.4 X |

OTHER PUBLICATIONS

Friedrichsen et al., Chem. Abstracts, (1972), Vol. 76, 59245, Abstract of Ger. Offen. 2020482, Nov. 11, 1971.

Sueta et al., Chem. Abstracts, (1954), Vol. 48, 2109c, Abstract of Japanese Patent 1412 (1952).

Sueta et al., Chem. Abstracts, (1954), Vol. 48, 2776f, Abstract of Japanese Patent 2115 (1952).

Primary Examiner—Henry R. Jiles
Assistant Examiner—Bernard I. Dentz
Attorney, Agent, or Firm—Allison C. Collard

[57] ABSTRACT

A process for preparing phthalic anhydride by oxidation of naphthalene or o-xylene or a mixture thereof with air with the use of fixed bed catalysts consisting of a carrier coated with vanadium pentoxide and titanium dioxide, said process consisting of passing naphthalene or o-xylene, or a mixture of both, with air over a catalyst layer which contains 0.25 to 1.5% by weight of potassium ions calculated on the coating, said layer forming 40 to 70% by volume of the total catalyst mass, and thereafter passing the mixture over a catalyst layer the coating of which is potassium-free.

4 Claims, No Drawings

PROCESS FOR MAKING PHTHALIC ANHYDRIDE

This invention relates to the preparation of phthalic anhydride by oxidation of naphthalene or o-xylene by air with the use of fixed bed catalysts.

The preparation of phthalic anhydride by oxidation of naphthalene or o-xylene by air oxidation with the use of fixed bed catalysts consisting of carriers coated by vanadium pentoxide and titanium dioxide has been described in a number of patents. Whereas the oxidation of o-xylene with coated carriers which contain only vanadium pentoxide and titanium dioxide (anatase), yield more than 100 kg phthalic anhydride per 100 kg o-xylene, the yields drop to 90 kg per 100 kg when naphthalene is used. When modified catalysts are used, (a large number have likewise been proposed) the catalysts obtained are either too active or not sufficiently active.

If the catalysts used are too active, they yield, at comparatively low temperatures of the salt bath, a very pure product, but in unsatisfactory yields. On the other hand, catalysts of lower activity produce high yields, but the produce of the reaction contains too much naphthoquinone, even when the salt bath is maintained at comparatively high temperatures.

It is an object of the present invention to provide a process for preparing phthalic anhydride by oxidation of naphthalene or o-xylene which is free of the disadvantages of the prior art methods.

According to the invention, it was found that the oxidation by air of naphthalene or o-xylene with the aid of fixed bed catalysts consisting of carriers coated with vanadium pentoxide and titanium dioxide proceeds very satisfactorily by first contacting mixtures, consisting of naphthalene and/or o-xylene, in air with a catalyst, which contains in the coating 0.25 to 1.5% by weight of potassium ions and subsequently, with a catalyst in the coating of which no potassium ions are present. The catalyst used in the first stage, forms 40 – 70 volume per cent of the total catalyst mass.

Using the process according to the invention, 95 – 100 kg phthalic anhydride of excellent quality are obtained from 100 kg naphthalene at salt bath temperatures ranging from 370° – 410°C. The potassium ions can be added to the coating in the form of any desired salt. When salts are used which are unstable at the conditions of the reaction, such as potassium acetate or potassium nitrate, they are converted, during the operation, into stable salts, e.g., potassium vanadate or potassium sulfate-pyrosulfate, the latter due to the sulfur content of naphthalene. However, it is preferable to add from the start stable salts such as potassium pyrosulfate, potassium vanadate, potassium phosphate or potassium chloride.

It is a further advantage of the process according to the invention that the same catalyst may be used for the oxidation of o-xylene or mixtures of o-xylene and naphthalene resulting in high yields of phthalic anhydride. When o-xylene is used, the yield is 102 – 106 kg phthalic anhydride from 100 kg o-xylene, depending on the purity of the latter. When mixtures are used, the yields lie between those for o-xylene and naphthalene.

In its simplest form, the process is carried out by filling the tubes of the usual reactors, in which the reaction gases pass from top to bottom in the lower part, with a layer of from 1 to 1.8 m potassium-free catalyst, and on top of this with a layer of 1.2 to 2 m in length with potassium-containing catalyst. Preferably the entire height of the catalyst layer is about 2.6 to 3.2 m. Higher layers will result in higher throughput. It is further possible to reverse the direction of flow, and, accordingly, the sequence of layers; or to work in reactors arranged serially.

By "potassium-free" it is understood to define a catalyst to which no potassium salts have been added. The low potassium content of commercial titanium dioxide pigment may be disregarded. The coating of the potassium-free catalyst may either consist solely of vanadium pentoxide and titanium dioxide, or it may contain other activating additives such as oxides of cobalt, silver, molybdenum, tungsten and cerium in amounts up to 5% by weight calculated on the coating.

The remaining data for potassium-free and potassium-containing catalysts, such as quantity of coating per liter of carrier, atomic ratio titanium: vanadium, BET-surface of the coating mass, kind, shape and size of the carriers, coating application etc., may be chosen in accordance with the state of the art. German Offenlegungsschrift 2,106,796 is especially referred to.

The conditions of the reaction, such as composition of the reaction gases, rate of passage, and temperature of the salt bath are likewise conventional in this art.

In the following, the invention will be illustrated in a number of examples which are given by way of illustration and not of limitation.

GENERAL REMARKS ON EXAMPLES

In all the examples, reactor furnaces were used having tubes of 3 m length and 25 mm inside diameter. The temperatures are those of the salt bath. The charge was 4 standard cubic meter air and 160 g naphthalene per tube and per hour. The naphthalene used was 98.3% pure. It contained 0.46% sulfur and 0.04% nitrogen.

The yields indicated in per cent, signify kg precipitated phthalic anhydride per 100 kg naphthalene used up. The figures given are averages found in a period of at least 2 weeks. The coating was applied to the carrier partly in a coating chamber containing fluidized carrier bodies at an air current temperature of 110°C (Examples 1, 4, 5, 6) partly in a coating drum at 70°– 90°C with an aqueous suspension (Examples 2, 3) which contained, per liter water, 400 g active mass and 140 g of a dispersion containing 50% by weight of solid vinyl acetate-vinyl laurate copolymer (25% by weight of vinyl laurate). Per liter carrier, 50 g active catalyst mass, namely titanium dioxide + vanadium pentoxide plus additives, were used; of these 50 g, 85 – 88% by weight adhered to the carrier bodies.

The titanium dioxide used was a mixture of anatase, as used in pigments, (BET-surface 9.7 m$^2$/g) and titanium dioxide hydrate in the ratio 3:1 calculated on the titanium dioxide content. The atomic ratio titanium:-vanadium was 4.5:1. Additives are indicated in per cent weight of the active mass.

EXAMPLE 1

Carrier body: 8 mm balls of magnesium silicate. Salt bath: 392°C. Catalyst: 1.6 m with 7% potassium hydrogen phosphate and 1.4 m with 2% molybdenum (VI) oxide. Yield: 95.6%. Naphthoquinone in the crude anhydride: 0.02%. When potassium-free catalyst was used, in a layer 2.6 m high, it resulted in a crude anhydride of equal purity already at 375°C. However, the yield was only 88%. When only potassium-containing catalyst was used, the layer being 2.6 m high, it yielded a very impure product even at 420°C, which contained 1.2% naphthoquinone. The yield was 97%.

EXAMPLE 2

Carrier body: 8 mm balls of porcelain. Salt bath 409°C, Catalyst: 1.5 m with 2% potassium hydrogen phosphate and 1.5 m without additives. Yield: 99%. Naphthoquinone in the crude anhydride: 0.15%. The catalyst used alone without any additive at a height of 2.6 m, yielded a product of equal purity already at 360°C. However, the yield was only 90%. With potassium-containing catalyst alone, no useful phthalic anhydride was obtainable.

EXAMPLE 3

Carrier body: 7.5 – 9.5 mm balls of corundum. Salt bath: 380°C. 1.5 m catalyst with 1% potassium pyrosulfate and 1.5 m catalyst without additive. Yield: 96%. Naphthoquinone in the crude anhydride: 0.01%. When the heights of the layers are changed to 1 m and 2 m respectively, the yield drops to 91%. However, the same purity is reached at 365°C. The potassium-containing catalyst alone, used in a height of 3 m, yielded at 420°C a crude anhydride with 0.7% naphthoquinone. The yield in phthalic anhydride was 95.7%.

EXAMPLE 4

Carrier body: 7.3 –9.5 mm quartz gravel. Salt bath: 380°C. 1.5 m catalyst with 1.2% potassium vanadate and 1.3 m catalyst without additive. Yield: 96.5%. Naphthoquinone in the crude anhydride 0.01%.

EXAMPLE 5

Carrier body: 7.3 – 9.5 mm quartz gravel. Salt bath: 380°C. 1.5 m catalyst with 0.85% potassium chloride and 1.5 m catalyst without additive. Yield: 96.5%. Naphthoquinone in the crude anhydride 0.1%.

EXAMPLE 6

Carrier body: 8 mm balls of magnesium silicate. Salt bath: 380°C. Catalyst: 1,5 m with 1 % potassium hydrogen phosphate ($K_2HPO_4$) and 1,3m catalyst without additive. Feed composition: 176g o-Xylene (96% purity, 0,1% sulfur) and 4 standard cubic meter air per tube and hour. Yield: 104%. Phthalide in the crude anhydride 0,02%. Using a feed composition of 120g o-Xylene (96% purity), 40g naphthaline (purity same as in previous examples) and 4 standard cubic meter air per tube and hour, the same catalyst arrangement at the same salt bath temperature gave a yield of 102 kg crude phthalic anhydride per 100 kg of hydrocarbon feed. The crude anhydride contained 0,05% phthalide and 0,03 % naphthoquinone.

What is claimed is:

1. In a process for preparing phthalic anhydride by the oxidation of naphthalene or o-xylene or a mixture thereof with air employing a fixed bed catalyst consisting of a carrier coated with vanadium pentoxide and titanium dioxide, at an elevated temperature, the improvement which comprises passing the vapors of naphthalene or o-xylene or a mixture of both, with air, over a first catalyst layer consisting of a carrier coated with vanadium pentoxide and titanium dioxide, said layer containing in said coating, from about 0.25 to about 1.5 per cent by weight of potassium ions calculated on the coating, said layer forming 40 to 70 per cent by volume of the total catalyst mass, and then passing said vapors over a second catalyst layer consisting of a carrier coated with vanadium pentoxide and titanium dioxide and being substantially free from potassium ions.

2. The process according to claim 1 wherein the height of the catalyst layer totals 2.6 to 3.2 m.

3. The process according to claim 2 wherein the height of the potassium ion-containing layer is from 1.2 – 2.0 m and the height of the potassium ion-free layer is 1–1.8 m.

4. The process according to claim 1 wherein the atomic ratio of titanium : vanadium is 4.5:1.

* * * * *